Oct. 10, 1939.   K. M. PAULI   2,175,637
INDEX MECHANISM FOR THE STEERING WHEELS OF CARRIAGES
Filed May 11, 1938
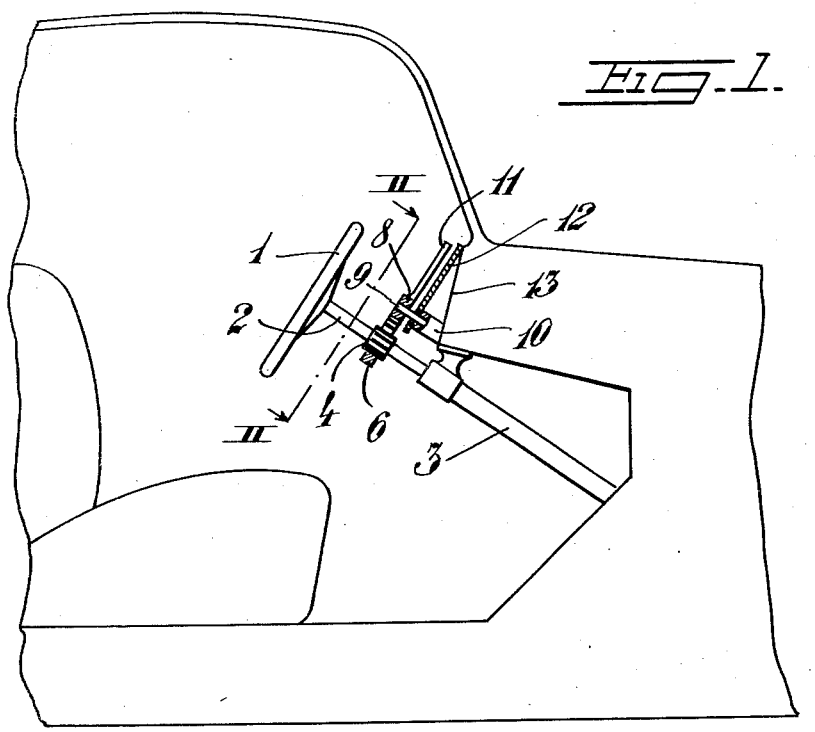
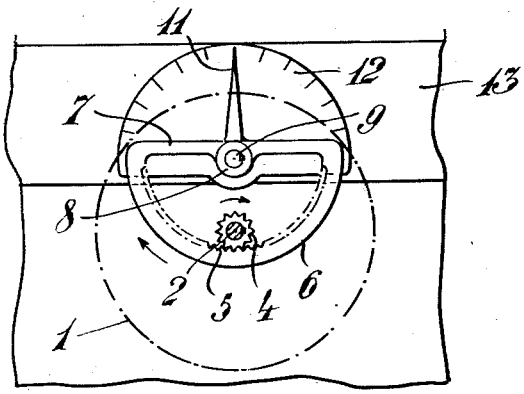
Inventor
Knut M. Pauli,
By
Sommers & Young Attys Patented Oct. 10, 1939

2,175,637

UNITED STATES PATENT OFFICE 2,175,637

INDEX MECHANISM FOR THE STEERING WHEELS OF CARRIAGES

Knut Martin Pauli, Saltsjobaden, Sweden

Application May 11, 1938, Serial No. 207,415
In Sweden May 14, 1937

2 Claims. (Cl. 116—31)

The present invention relates to index mechanisms for the steering wheels of carriages.

The invention has for its object to create an improved mechanism of this type in which by simple constructional means the effect is attained that the direction of motion of the carriage set by means of the steering wheel will be indicated directly.

The invention may be used in all kinds of carriages, which are steered by means of a wheel, for instance motor cars, motor boats, ships, airplanes and the like. One embodiment of the invention applied to motor cars is illustrated in the annexed drawing by way of example.

Fig. 1 is a longitudinal section taken along the axis of the shaft of the steering wheel, showing also the adjacent parts of the motor car.

Fig. 2 is a cross section taken on the line II—II in Fig. 1 and showing the mechanism according to the invention from the upper side.

The shaft 2 of the steering wheel 1, is mounted in a sleeve 3, attached to a suitable part of the vehicle body between the driver's seat and the motor casing. Above the sleeve 3 (in Fig. 1 on the left side of the sleeve), a pinion 4, is mounted firmly on the shaft 2 so as to rotate with the steering wheel. The pinion 4 meshes with a rack 5, which is disposed on the internal side of a semi-circular part 6. The ends of this semi-circular part are connected with each other by means of a diametrical arm 7, which is provided with a hub 8 in the centre. The hub 8 is mounted firmly upon the shaft 9. The shaft 9 is mounted rotatably in a sleeve 10, which is parallel to the sleeve 3 and is fixed to a suitable part of the instrument board 13. The hub 8 is connected firmly with a pointer 11, which perpendicularly extends from the diametrical arm 7. Under the pointer 11 a graduated disc 12 is provided, preferably attached to the sleeve 10. By rotation of the steering wheel the pointer moves over this graduated disc.

On account of the fact that the pinion 4 is in engagement with the internally toothed rack, the pointer 11, upon rotation of the steering wheel 1, will turn in that direction, in which the front wheels of the motor car are set, and by a suitably selected ratio of gearing the pointer 11 may be caused to indicate the direction in which the motor car will move. The ratio of the diameter of the internal rack 5 and the diameter of the pinion 4 should be equal to the ratio of the greatest angle, which the steering wheel describes out of its middle position to one of its outer positions, and the greatest angle, which the front wheels can be turned out of the middle position to one of the outer positions. This ratio may be 10:1. For instance, if the steering wheel can be rotated 1½ revolutions, that is 540°, and the front wheels can be turned an angle of 54°, the diameters of the internal rack 5 and the pinion 4, thus, should be in the ratio of 540:54 or 10:1. Of course this value is dependent on the special construction of the carriage in each individual case.

Especially, the invention is suitable for use in motor cars. By a glance at the index member the driver can tell the direction, in which the front wheels are set, and thereby ascertain the course in which the motor car will move. This possibility means a great advantage especially in driving in curves, because without a direct control of the setting of the front wheels it is easy to get too close to the curb or the edge of the ditch or too far out in the street or road to avoid collisions with approaching vehicles. The mechanism according to the invention will make it easier to steer the motor car in the desired direction and, therefore, will be of the very greatest importance for improving the safety of the traffic. The advantages will be especially marked when unpractised drivers are sitting at the steering wheel. A very important advantage consists also therein that the mechanism according to the invention is of such simple construction that it may be adapted for all type of cars without considerable costs.

The invention is not limited to the embodiment illustrated in the drawing and described above.

What I claim is:

1. In index mechanism for the steering wheel of a carriage, in combination, a shaft carrying the wheel, a pinion mounted upon the shaft adjacent said wheel, and connected to the shaft to rotate with the steering wheel, a semi-circular rack toothed on its internal side and engaging said pinion, a support on which the rack is rotatably mounted, an index member attached to said rack, the ratio of gearing between the rack and pinion being such that the index member will show the direction in which the carriage will move after rotation of the steering wheel, the axis of rotation for said rack being in parallel with the axis of the steering shaft.

2. In index mechanism for the steering wheel of a carriage, in combination, a shaft carrying the steering wheel, a pinion mounted upon the shaft adjacent said wheel, and connected to said shaft to rotate with the steering wheel, a semi-circular rack toothed on its internal side and engaging said pinion, a support on which the rack is rotatably mounted, an index member attached to said rack, the ratio of gearing being such that the index member directly will show the direction in which the carriage will move after rotation of the steering wheel, the axis of rotation for said semi-circular rack being in parallel with the axis of the steering shaft, and a graduation member fixed on said support below the index member and cooperating with the same.

KNUT MARTIN PAULI.